(12) United States Patent
Parks et al.

(10) Patent No.: US 6,193,827 B1
(45) Date of Patent: *Feb. 27, 2001

(54) OXYGEN AND FLAVOR BARRIER LAMINATE INCLUDING AMORPHOUS NYLON

(75) Inventors: Christopher J. Parks, Ellicott, MD (US); Debora F. Massouda, Ponca, OK (US)

(73) Assignee: Westvaco Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,916

(22) Filed: May 4, 2000

Related U.S. Application Data

(60) Continuation of application No. 09/273,150, filed on Mar. 19, 1999, now Pat. No. 6,113,719, which is a division of application No. 07/875,452, filed on Apr. 29, 1992, now Pat. No. 6,149,993, and a continuation-in-part of application No. 07/721,813, filed on Jun. 26, 1991, now abandoned.

(51) Int. Cl.[7] .................................................. B32B 31/30
(52) U.S. Cl. ..................... 156/82; 156/244.23; 156/324
(58) Field of Search ................................ 156/82, 244.11, 156/244.23, 324, 497

(56) References Cited

U.S. PATENT DOCUMENTS

| | | |
|---|---|---|
| 3,972,467 | 8/1976 | Whillock et al. . |
| 4,087,587 | 5/1978 | Shida et al. . |
| 4,233,367 | 11/1980 | Ticknor et al. . |
| 4,407,873 * | 10/1983 | Christiensen et al. ................. 428/35 |
| 4,513,036 | 4/1985 | Thompson et al. . |
| 4,698,246 | 10/1987 | Gibbons et al. . |
| 4,701,360 | 10/1987 | Gibbons et al. . |
| 4,753,832 | 6/1988 | Brown et al. . |
| 4,777,088 * | 10/1988 | Thompson et al. ................... 428/323 |
| 4,789,575 | 12/1988 | Gibbons et al. . |
| 4,800,129 | 1/1989 | Deak . |
| 4,806,399 | 2/1989 | Gibbons et al. . |
| 4,835,025 | 5/1989 | Thompson et al. . |
| 4,859,513 | 8/1989 | Gibbons et al. . |
| 4,880,701 | 11/1989 | Gibbons et al. . |
| 4,888,222 * | 12/1989 | Gibbons et al. ...................... 428/312 |
| 4,921,733 | 5/1990 | Gibbons et al. . |
| 4,940,612 | 7/1990 | Gibbons et al. . |
| 4,982,872 * | 1/1991 | Avery ................................... 220/461 |
| 4,988,546 | 1/1991 | Tanner et al. . |
| 5,002,833 | 3/1991 | Kinsey, Jr. et al. . |
| 5,141,801 * | 8/1992 | Takeshita et al. ................. 428/476.1 |
| 5,552,002 * | 9/1996 | Farrell et al. ........................... 156/82 |
| 6,113,719 * | 9/2000 | Parks et al. ............................ 156/82 |

FOREIGN PATENT DOCUMENTS

| | | |
|---|---|---|
| 0381922 | 8/1990 | (EP) . |
| 2084331 | 5/1989 | (JP) . |

OTHER PUBLICATIONS

*Plastics World*, Jul. 1984, pp. 42–47.
*Plastics World*, Feb. 1986, pp. 36–39.
*Aseptipak*, Apr. 4–6, 1984, pp. 119–148.
"Selar PA" Brochure, Aug. 1990.
"CAPRAN Nylon Films" Brochure, 1985.
European Search Report dated Oct. 9, 1992.
Handbook of Polyamide Resins, published Jan. 30, 1988 by Nikkan Kogyo Simbun Ltd., pp. 287–306.
Handbook of Adhesion Technologies, Sections of "(3) Copolymer of Vinyl Acetate and Maleic Acetate and Maleic Anhydride" and "(4) Copolymer of Vinyl Methyl Ether and Mamleic Anhydride," published in Jul. 1963 by Nikkan Kogyo Simbun Ltd. sec. vol. pp. 1067–1066.

* cited by examiner

Primary Examiner—James Sells
(74) *Attorney, Agent, or Firm*—Baker Botts L.L.P.

(57) ABSTRACT

A non-foil composite laminate for an improved container providing an effective barrier for the containment of essential oils and prevention of losses of vitamin C. The non-foil composite laminate comprises an inner barrier layer of amorphous nylon and outer layers of heat sealable olefin polymer, facilitating manufacture while retaining desirable barrier properties.

15 Claims, 6 Drawing Sheets

OXYGEN AND FLAVOR BARRIER LAMINATE INCLUDING AMORPHOUS NYLON

This application is a continuation of U.S. application Ser. No. 09/273,150 filed Mar. 19, 1999 U.S. Pat. No. 6,113,719 which is a divisional application of U.S. application Ser. No. 07/875,452 filed Apr. 29, 1992 U.S. Pat. No. 6,149,993 which is a continuation-in-part of U.S. application Ser. No. 07/721,813 filed Jun. 26, 1991 abandoned all of which are incorporated herein by reference.

BACKGROUND OF THE INVENTION

The present invention relates to paperboard laminates, and more particularly to a non-foil paperboard laminate useful for making containers for products such as fruit and citrus juices, beverages and the like as well as non-liquid dry products, wherein the laminate has wood oxygen barrier characteristics as well as the ability to protect the products packaged therein against the loss of essential oils, flavor and vitamins.

Paperboard coated with low-density polyethylene (LDPE) has been used to make beverage containers, but falls short in providing an acceptable container. In particular, paperboard coated with LDPE has a relatively high permeability to oxygen which may lead to loss of flavor components and vitamins through oxidation. Flavor loss can also occur as a result of migration or uptake of flavor components into the LDPE layer, a process referred to as "scalping." Additional barrier materials have therefore been investigated to achieve the desired goal.

The oxidative loss of the vitamin C can be substantially reduced by the use of a laminate containing a metal foil as a liner along the interior of the container. However, the economics involved in using a metal foil preclude this solution from being a viable alternative. A search for economical alternatives to foil has resulted in the development of laminate structures utilizing coextruded polymer materials such as polypropylene, polyvinylidene chloride (PVdC) and ethylene vinyl alcohol copolymer (EVOH) as the barrier material. See, for example the Tanner U.S. Pat. No. 4,988,546, the Gibbons et al. U.S. Pat. Nos. 4,789,575 and 4,701,360, the Thompson et al. U.S. Pat. No. 4,513,036, and the Huffman U.S. Pat. No. 5,059,459.

In addition to being less expensive than foil-containing structures, paperboard laminates containing such barrier materials may exhibit superior flavor loss properties due to the use of lower levels of LDPE as the product contact layer. Many conventional commercial structures for a paperboard carton for juice and similar products now utilize a laminate containing ethylene vinyl alcohol copolymer as a barrier to oxygen and flavor oils.

Nylon has also been proposed and used commercially as a barrier polymer in plastic bottles (see *Plastics World,* February 1986, pp. 36–38), as a plastic packaging material (*Aseptipak* 84, pp. 119–148), and as a replacement for cellophane (*Plastics World,* July 1984, pp. 42–47). The properties of a barrier material used in plastic bottles or for packaging, however, are quite different from those required for a paperboard container and barrier materials useful in plastic bottles or wrapping material may not be useful for a barrier in a paperboard container. For a paperboard container, the Whillock et al. U.S. Pat. No. 3,972,467 discloses a nylon film laminated to a paperboard substrate by a low density polyethylene layer and having a low density polyethylene product contact layer. In this case, the nylon film is specified as having a tensile strength at the yield point of more than 4000 psi and an elongation at fracture of greater than about 200%. Such laminated film structures are expensive and require complex laminating equipment and the use of such high strength materials causes difficulty in the cutting of container blanks from a web of barrier board material and in the forming of the container.

The Thompson et al. U.S. Pat. No. 4,777,088 discloses a barrier board structure for flavor oil and oxygen retention in a juice carton wherein an extruded nylon layer of unspecified composition and physical properties is combined with a layer of a special ionic copolymer material sold by duPont tinder the trade name Surlyn on one or both sides. As described in U.S. Pat. No. 4,777,088, Surlyn is a necessary constituent of the described nylon barrier board laminate structure.

The Brown et al. U.S. Pat. No. 4,753,832 discloses a barrier based structure which has a product contact barrier layer of glycol modified polyethylene terephthalate (PET-G) and may also have a nylon oxygen barrier layer, but that patent does not disclose any specific type of nylon or specify desirable properties of the nylon material. As described in U.S. Pat. No. 4,753,832, PETG is a necessary constituent of the described barrier board laminate structure.

The Gibbons et al. U.S. Pat. No. 4,921,733 discloses various Nylon 6, Nylon 11 and Nylon 12 polymers, which are crystalline materials, having tensile strength of 10,000 psi or more, as abuse-resistant layers for use in combination with a caulking polymer such as a Surlyn ionomer resin and an oxygen barrier such as aluminum foil for paperboard containers.

SUMMARY OF THE INVENTION

It is an object of the present invention to provide an improved, heat-sealable laminate material for a juice carton which does not transmit flavor/odor ingredients of citrus and other juices, exhibits a substantial barrier to the loss of vitamin C, and has performance equal to or better than that of conventionally used polymer barrier laminates and reduces or eliminates manufacturing difficulties without detrimental economics.

In accordance with the present invention, improved heat-sealable, non-foil laminates for fruit or citrus juices, beverages and the like, as well as non-liquid dry products, which are easy to manufacture and which provide reliable performance in the field, include a multilayer polymer sandwich structure containing an amorphous nylon polymer barrier layer applied to the inner surface of a paperboard substrate.

Amorphous nylon is a relatively low strength polymer material different in physical characteristics from the high-strength crystalline nylon materials, such as the Nylon 6 materials heretofore used in barrier board laminates but having equivalent oxygen barrier characteristics. Surprisingly, it has been found that such low-strength amorphous nylon can be used as the barrier material in a paperboard substrate without requiring an additional high strength polymer or an additional oxygen barrier layer.

Thus, in one embodiment of the present invention a paperboard coated with an outer heat sealable polyolefin layer, preferably low-density polyethylene, is provided as the base material and a five-layer sandwich structure comprising polyolefin/tie layer/amorphous nylon/tie layer/polyolefin is coextruded onto the inner paperboard surface to produce a laminate comprising, from the outside of the container to the interior of the container, the following layers: polyolefin/board/polyolefin/tie layer/amorphous nylon/tie layer/polyolefin.

The polyolefin used in the sandwich layer is preferably low density polyethylene. If desired, to provide greater thickness to increase product stiffness, a further heat sealable polyolefin product contact layer, preferably low-density polyethylene, may be extrusion coated onto the inner surface of the coextruded sandwich layer. The entire structure can be fabricated in line in a single pass by coating one side of a flame treated paperboard with polyolefin prior to application of the coextruded sandwich to the opposite side of the paperboard. The final structure provides a barrier board laminate having a heat sealable polyolefin, preferably polyethylene, on its inner and outer surfaces to provide the most desirable heat-sealable characteristics while providing equivalent barrier characteristics and being easier to form into container blanks and containers than prior art structures.

In another embodiment of the present invention, a laminate structure for paperboard cartons or containers comprises paperboard which is coated with an outer layer of polyolefin, preferably LDPE, to provide the outer heat sealable layer of the carton. Subsequently, in a single manufacturing step, a three-layer barrier sandwich structure comprising tie layer/amorphous nylon/tie layer is coextruded onto the inner surface of the paperboard, after which a layer of polyolefin is extruded onto the exposed tie layer to form a product contact layer. Preferably, the polyolefin used as the product contact layer is low density polyethylene.

Cartons can be constructed easily from the laminates of the present invention and provide excellent gas-barrier protection for liquid and dry products and significant flavor oil retention and prevention of loss of vitamin C of citrus juices contained therein, resulting in extended shelf life for such products. Moreover, carton blanks prepared from laminates of the present invention exhibit better runnability on equipment used for folding carton blanks compared to carton blanks comprising laminates having an ethylene vinyl alcohol barrier layer, thereby further facilitating the manufacturing process.

DETAILED DESCRIPTION

Figure 1:
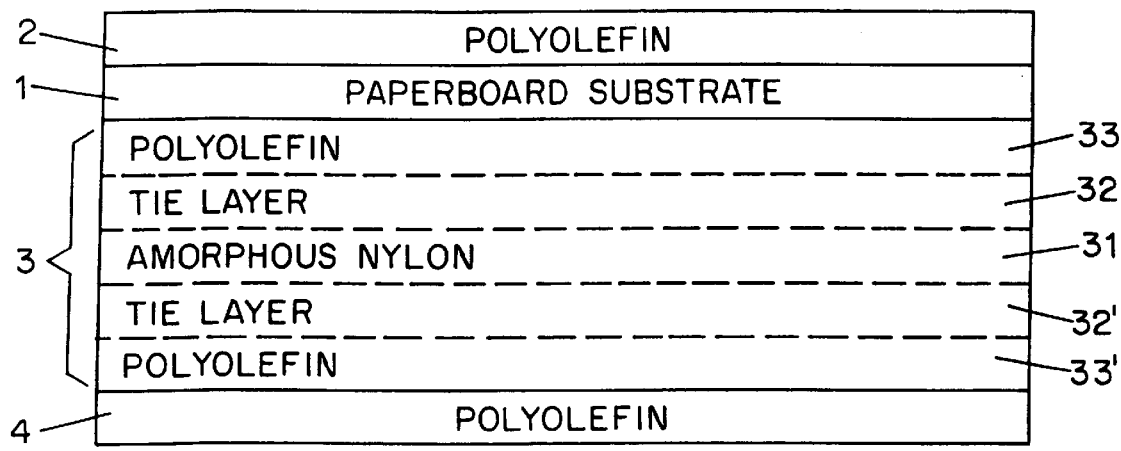
FIG. 1 is a schematic cross-sectional illustration showing a barrier board laminate arranged according to the present invention.

Looking at FIGS. 1 and 2, a preferred embodiment of the present invention can be prepared as follows:

First, a paperboard substrate 1 is flame or corona treated on one of its surfaces. Second, a layer 2 of LDPE is extrusion coated onto the treated surface of the paperboard 1 at a temperature of about 600 degrees F., preferably 540 to 620 degrees F., to achieve a good bond to the paperboard and to provide the outer surface of the laminate. If desired, rather than coating an LDPE layer on an uncoated paperboard substrate as the first step of the process, a paperboard substrate previously coated with LDPE may be used.

The second, inner surface of the paperboard substrate is then flame or corona treated and a five-layer sandwich 3 of amorphous nylon 31 surrounded by two Bynel tie layers 32 and 32' and two LDPE covering layers 33 and 33' is coextruded directly onto the treated inner surface of the paperboard. The temperature of the extrusion should be controlled to assure good polymer extrusion characteristics while avoiding degradation of the amorphous nylon 31 and tie layers 32 and 32'. In three examples of the preparation of such laminates the temperatures (° F.) for each material in the sandwich as supplied to the extruder were as follows:

|  | 1 | 2 | 3 |
|---|---|---|---|
| Amorphous Nylon | 580 | 613 | 618 |
| Bynel | 580 | 621 | 621 |
| LDPE | 620 | 582 | 576 |

Finally a product contact layer 4 of low-density polyethylene is extruded onto the inner surface of the five-layer sandwich 3. The total weight of the polymers extruded onto the inner paperboard surface should preferably be less than 55 lbs/ream. (Ream size=3,000 sq. feet) The laminate is easily scored and cut into blanks, which are later folded and side-seam heat-sealed in a conventional manner. The prepared blanks are ready for filling and sealing on conventional equipment in the normal manner.

Figure 3A:
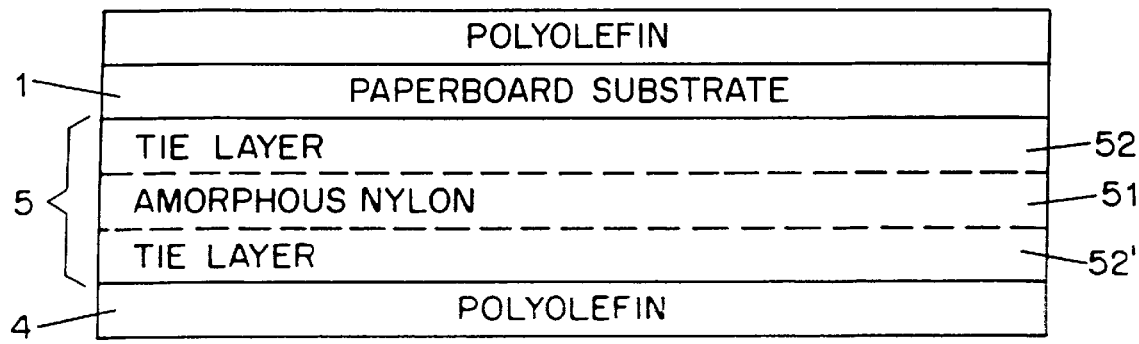
FIGS. 3(a) and 3(b) are schematic cross-sectional illustrations showing other forms of barrier board laminates of the present invention.

According to a second embodiment of the invention, shown in FIG. 3(a), a three layer sandwich 5 including a central amorphous nylon layer 51 and two Bynel tie layers 52, and 52' is coextruded onto the paperboard substrate 1, with one of the tie layers 52 contacting the paperboard substrate 1. A polyolefin layer 4 is then coated onto the other tie layer 52' to provide the inner product contact surface.

Figure 3B:
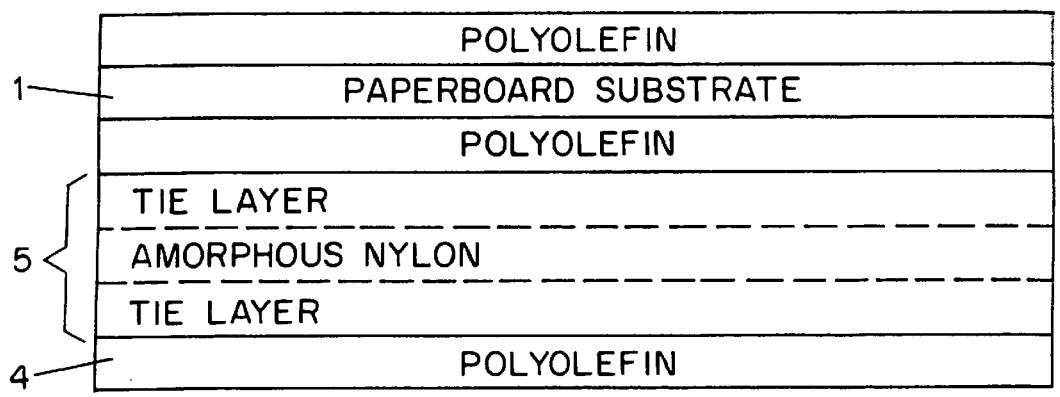

In another embodiment shown in FIG. 3(b), the sandwich layer is coextruded directly onto a previously prepared base material comprising paperboard coated on both sides with LDPE. If the coextruded sandwich has three layers as shown in FIG. 3(a), the ultimate structure is essentially the same as that described above, but an extra polyolefin layer is included between the paperboard and the coextrusion.

In these processes, the coextruded sandwich layer is preferably symmetrical because symmetrical layers are generally the easiest to coextrude. It will be understood, however, that the product contact layer could be included as part of the coextruded sandwich in an asymmetric coextrusion process if desired.

Olefin polymers suitable for use in the present invention are heat-sealable and include polypropylene, high density polyethylene, medium density polyethylene, low density polyethylene, and linear low density polyethylene and combinations thereof. Most preferred is low density polyethylene. Any commercial extrusion coating grade polyolefin is suitable for use herein. The olefin polymers may include additives to provide desired flow, adhesion or heat sealing characteristics.

Paperboard for use in the present invention includes suitably high grade paperboard stock, for example milk carton stock. The board may have a basis weight of about 150 to 300 lbs/ream, preferably 260 lbs/ream. Either or both paperboard surfaces can be flame or corona treated and/or primed to facilitate adhesion of subsequent polymer layers. Printers which may be used include polyethylene amine (PEI) or ethylene vinyl acetate.

The amorphous nylon used in the present invention should be suitable for coextrusion coating onto the paperboard substrate. To facilitate manufacture, a sandwich layer comprising the amorphous nylon together with coextruded polymers preferably should have an elongation at fracture less than about 200% and a tensile strength at the yield point less than about 4000 psi. Most preferably, the amorphous nylon itself should have tensile strength at yield less than 10,000 psi and an elongation at fracture of less than 200%. A preferred amorphous nylon, Selar PA 3426, is available from the DuPont Corporation of America. Nylons having a substantial degree of crystallinity, such as nylon 6 and nylon 6-6 have high tensile strength, such as 10,000 psi or more at yield, and an elongation at fracture greater than 200% and do not provide the advantages of the invention.

Tie layer resins suitable for coextruding with amorphous nylon in accordance with the invention include resins which have good adhesion to both amorphous nylon and polyolefins. Preferred tie layer resins having suitable adhesion properties include anhydride-modified copolymers, especially anhydride modified ethylene copolymers. Most preferred are anhydride modified linear low/low density ethylene copolymers. An anhydride modified linear low/low density ethylene copolymer particularly suitable for use as the tie layer material in the present invention is Bynel E388 available from the duPont Corporation of America. Another duPont Product, an anhydride modified ethylene acetate copolymer (Bynel E369) may also be used as the tie layer material. Other suitable tie layer materials are those described in U.S. Pat. Nos. 4,087,587 and 4,087,588, both of which are incorporated herein by reference. Materials of the type described therein are sold under the trade name Plexar.

The barrier laminates produced by the present invention exhibit excellent barrier properties and meet FDA requirements for use in food contact packaging. As an example, laminates of the present invention incorporating a five layer sandwich advantageously comprise an exterior coating of about 6–18 lbs per ream of LDPE, paperboard of varying thickness (depending on carton size), a coextruded sandwich layer applied to the inner paperboard surface comprising about 2–8 lbs/ream LDPE, 2–6 lbs/ream of an adhesive tie layer (Bynel E388), 4–12 lbs/ream amorphous nylon (Selar PA 3426), 2–6 lbs/ream tie layer (Bynel E388), 2–8 lbs/ream LDPE, and a product contact layer of 5–15 lbs/ream LDPE. Preferably, laminates of the present invention comprise an exterior coating of 12 lbs/ream LDPE, 260 lbs/ream paperboard, 3 lbs/ream LDPE, 4 lbs/ream Bynel E388, 6 lbs/ream Selar PA, 4 lbs/ream Bynel E388, 3 lbs/ream LDPE, and a product contact layer of 7 lbs/ream LDPE. Most preferably, laminates of the present invention comprise an exterior coating of 12 lbs/ream LDPE, 260 lbs/ream paperboard, 6 lbs/ream LDPE, 4 lbs/ream Bynel E388, 6 lbs/ream Selar PA, 4 lbs/ream Bynel E388, 6 lbs/ream LDPE, and a product contact layer of 7 lbs/ream LDPE. Ream size is 3,000 square feet.

Laminates of the present invention incorporating a four layer sandwich advantageously comprise an exterior coating of about 6–18 lbs/ream LDPE on paperboard of varying thickness (depending on carton size), and a coextruded sandwich layer applied to the interior surface of the paperboard comprising about 2–6 lbs/ream of anhydride-modified ethylene-based copolymer tie layer, 4–12 lbs/ream amorphous nylon, 2–6 lbs/ream anhydride-modified ethylene-based copolymer tie layer, and 5–15 lbs/ream LDPE.

Figure 4:
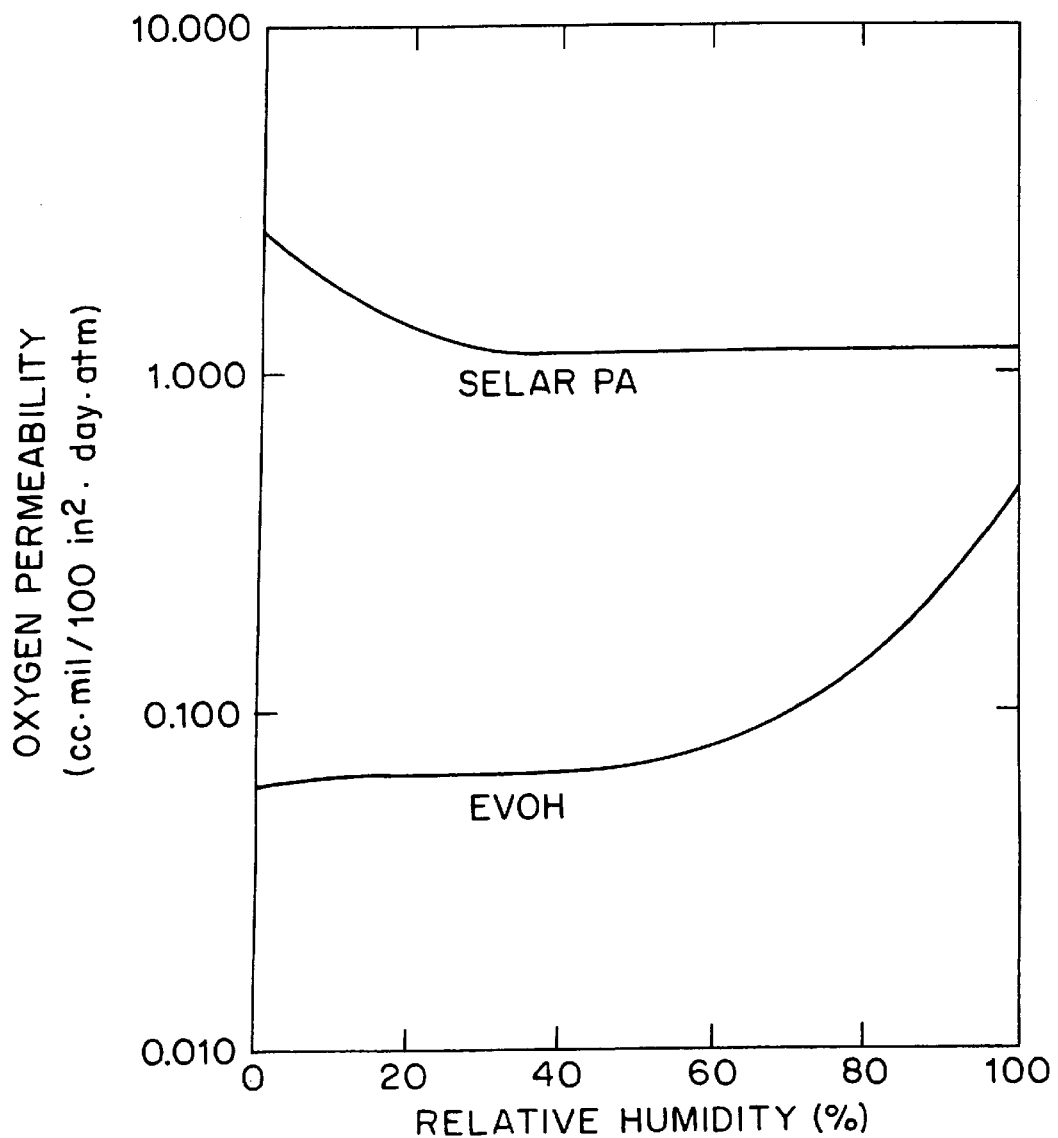
FIG. 4 is a graphical representation showing the variation with humidity of the oxygen permeability of amorphous nylon and ethylene vinyl alcohol copolymer.

Surprisingly, it has been found that laminates of the present invention provide barrier characteristics equivalent to laminates comprising an ethylene vinyl alcohol copolymer barrier layer. This would not normally be expected since, as shown in FIG. 4, amorphous nylon has a higher oxygen permeability as compared to ethylene vinyl alcohol copolymer even at high humidity which is the environment encountered in refrigerated packaged juice cartons.

EXAMPLE 1

A laminate according to the invention was prepared on an extrusion line having three extruder positions in series. The first extruder was used to apply twelve pounds per ream of LDPE to the felt side of a flame treated paperboard substrate. The other side of the substrate was flame treated and primed with PEI. Then at the second extrusion position, 3 extruders fed LDPE, Selar PA amorphous nylon and Bynel E388 into one die to produce a five layer (selector pattern=CBABC) coextruded sandwich of LDPE/Bynel E388/Selar PA/Bynel E388/LDPE. Finally, at the third extruder position a seven pound layer of LDPE was extrusion coated onto the coextruded sandwich. Container blanks were prepared and containers were formed without difficulty from the resulting barrier board structure.

EXAMPLE 2

Figure 5:
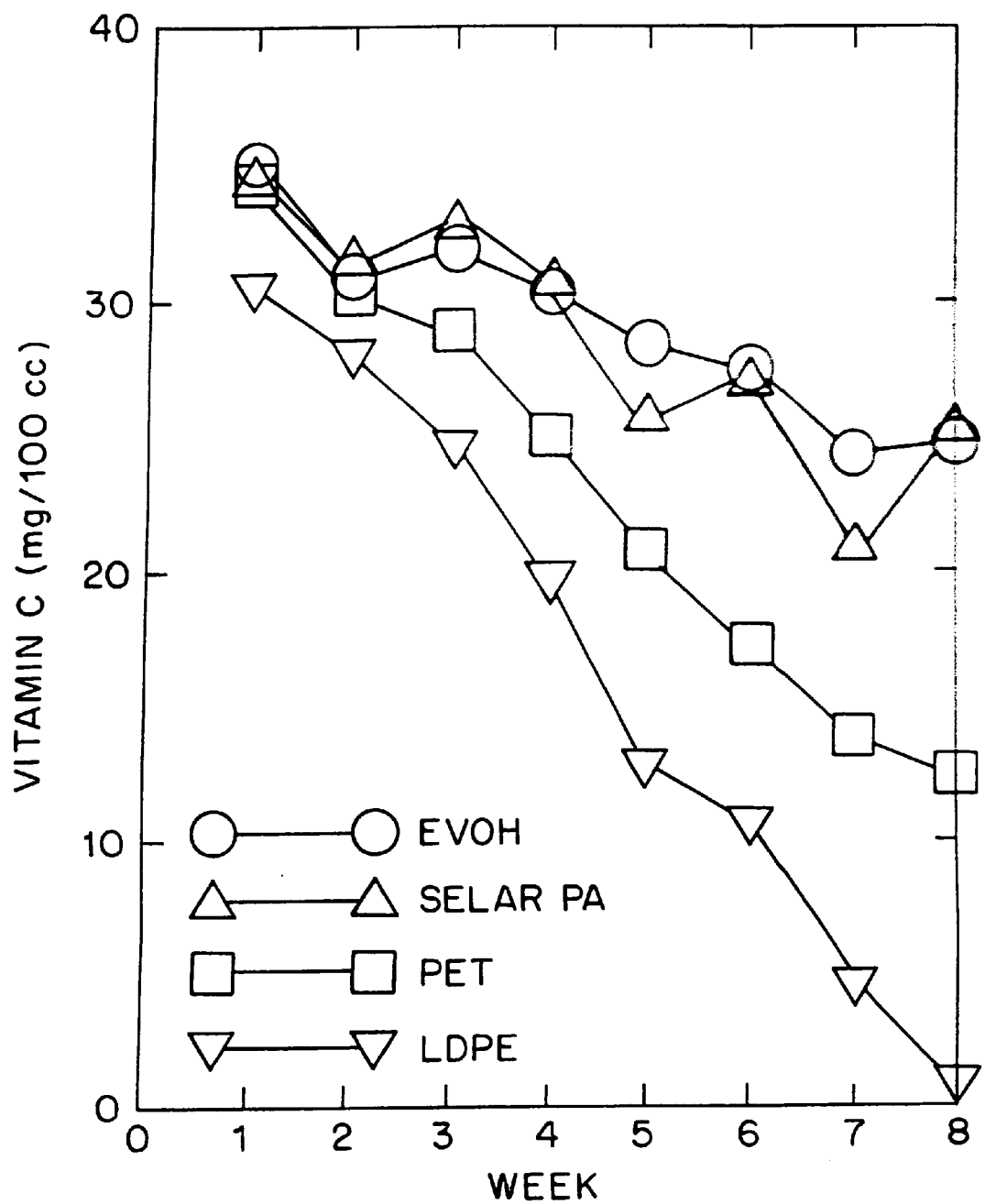
FIG. 5 is a graphical representation of vitamin C retention determined in accordance with Example 2.
Figure 6:
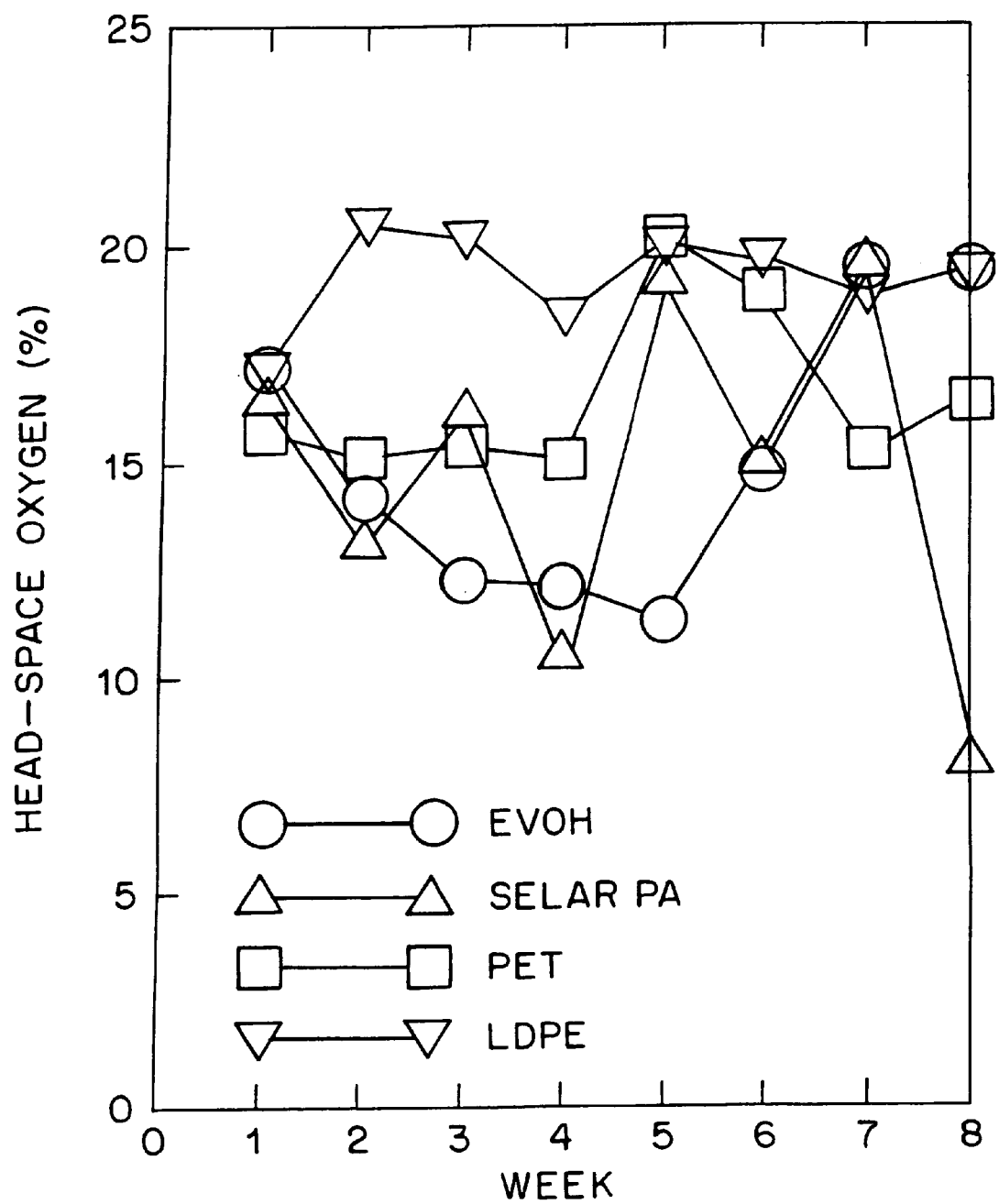
FIG. 6 is a graphical representation of the amount of oxygen in the headspace of cartons tested in Example 2.
Figure 7:
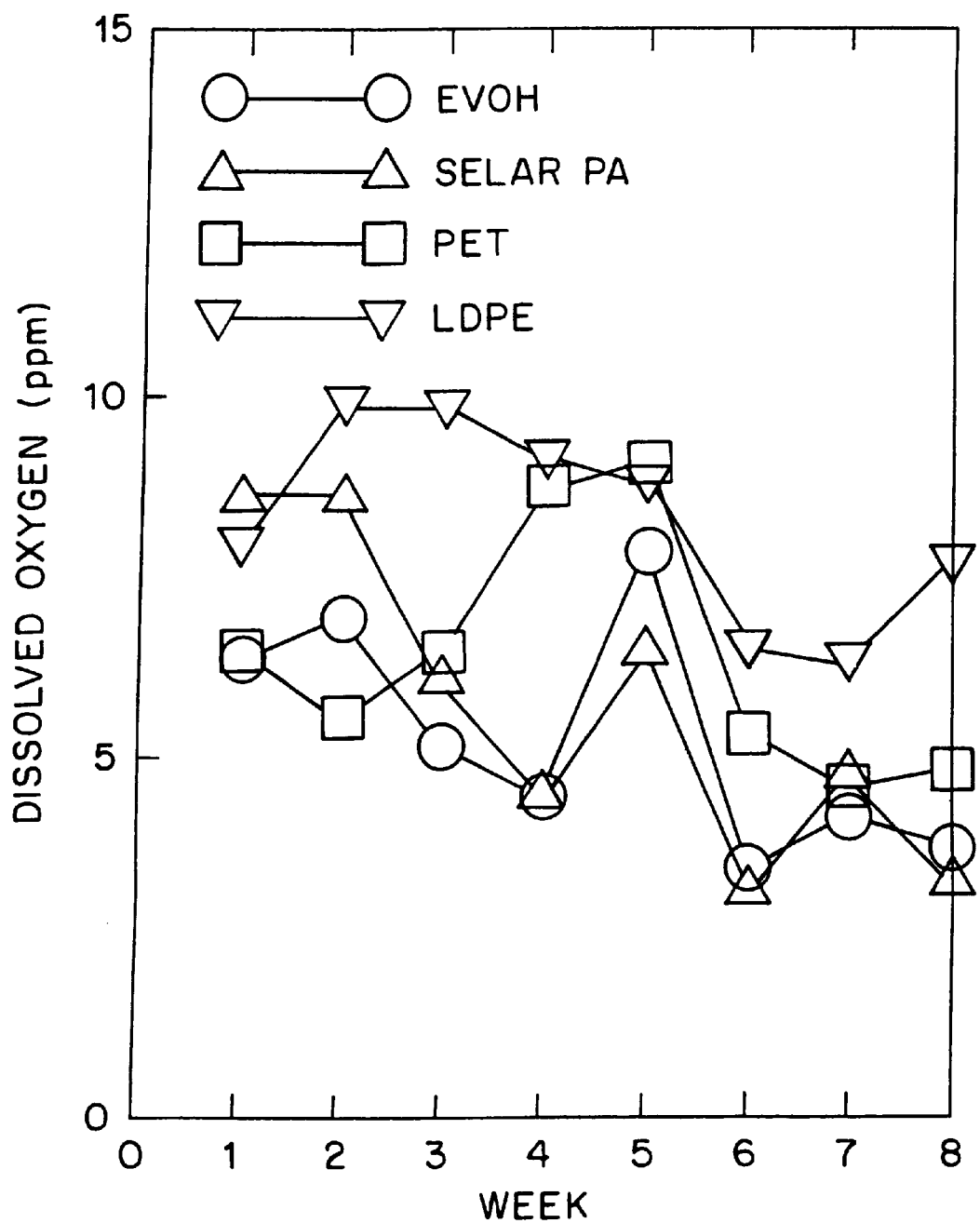
FIG. 7 is a graphical representation of the amount of dissolved oxygen in juices contained in the cartons tested in Example 2.

A comparison study of vitamin C, head space, and dissolved oxygen properties was carried out for containers made from laminate structures containing an amorphous nylon barrier layer and conventional ethylene vinyl alcohol copolymer, PET and LDPE barrier layer structures. The laminates were prepared having the structures shown in Table 1. Plexar 177 is a tie layer material available from Quantum Chemical Corporation. PET is an abbreviation for polyethylene terephthalate. FIGS. 5, 6, 7 show the results for Vitamin C, head space oxygen, and dissolved oxygen for four of the structures. The oxygen permeability of the laminate structure made according to the present invention is compared with that of an EVOH laminate and a PET laminate in Table 2.

To test vitamin C retention, head space oxygen levels and dissolved oxygen levels, paperboard cartons prepared from the laminates were filled with juice under refrigerated conditions and stored at 5 degrees C. for up to eight weeks. Cartons were removed for analysis each week. The vitamin C determination was carried out according to the AOAC procedure. Three aliquots of juice were taken and a titration done on each. Head space oxygen was measured using a Mocon HS-750 Head Space Analyser. 10 ml of headspace gas was withdrawn from the carton through an airtight septum and injected into the analyzer. The analyzer was calibrated with a standard gas mixture containing 0.5% oxygen and with room air. Dissolved oxygen was measured using a Yellow Springs Instruments, Inc. Model 58 Dissolved Oxygen Meter equipped with a Model 5739 dissolved oxygen probe. The juice carton was shaken and 125 ml was poured into a 250 ml beaker. The juice was stirred using the probe until the reading reached a steady level. The probe was calibrated using air at 100% relative humidity by placing the probe in an airtight container along with a saturated sponge.

The results are shown in Tables 3 and 4. The results set forth in Table 4 demonstrate that, despite a higher oxygen permeability characteristic as shown by prior data (FIG. 4), and as measured (Table 2), cartons made from the amorphous nylon barrier laminate structure of the present invention (Structure 5) surprisingly provide Vitamin C retention characteristics which are fully equivalent to those of cartons made from EVOH barrier laminate structures (Structures 2–4).

It is thus seen that the barrier board laminate of the present invention provides barrier characteristics equivalent to the most desirable products now available, namely, those containing an ethylene vinyl alcohol copolymer barrier layer. Further, the barrier board laminate of the invention is readily processed using conventional cutting, folding and heat sealing equipment to produce durable cartons in contrast to barrier board laminates using high strength polymer materials.

EXAMPLE 3

Figure 2:
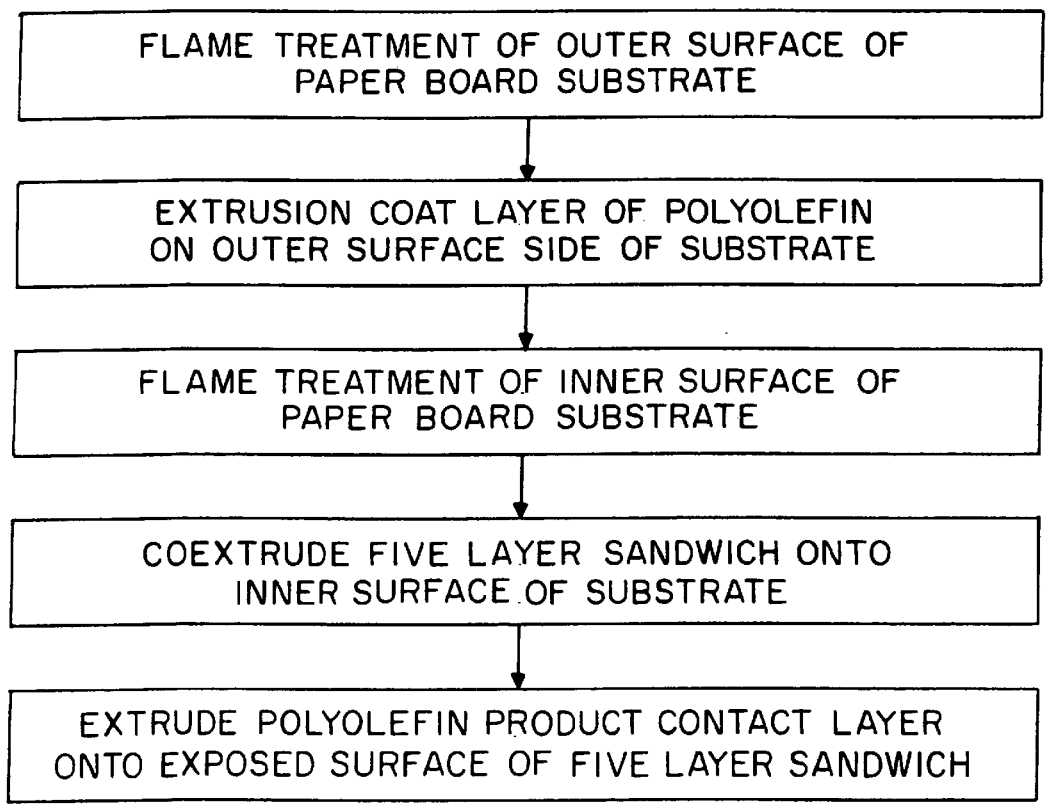
FIG. 2 is a block diagram representing a typical process for making the barrier board laminate of the present invention.

A comparison study of tensile strength and elongation properties for amorphous nylon, nylon-6 and PVDC-coated nylon-6 film materials and the coextruded sandwich of FIG. 1 was performed according to ASTM method D882. The results are shown in Table 5. As can be seen from Table 5, amorphous nylon has a lower elongation at fracture than nylon-6 and PVDC coated nylon-6 and the coextruded sandwich of the invention has lower tensile strength as well as lower elongation at fracture, resulting in desirable manufacturing characteristics.

Although the invention has been described herein with reference to specific embodiments and examples, many modifications and variations therein will readily occur to those skilled in the art. Accordingly, all such variations and modifications are included within the intended scope of the invention.

TABLE 1

Target Structures for Performance Comparison

| Structure 1. | control (standard EVOH structure) 12# LDPE/board/8# LDPE/flame/6# EVOH/4# Plexar 177/10# LDPE |
|---|---|
| Structure 2. | Bynel tie layer in standard EVOH structure 12# LDPE/board/8# LDPE/flame/6# EVOH/4# Bynel E388/10# LDPE |
| Structure 3. | low EVOH coat weight with Bynel tie layer 12# LDPE/board/8# LDPE/flame/4# EVOH/4# Bynel E388/10# LDPE |
| Structure 4. | high EVOH coat weight with Bynel tie layer 12# LDPE/board/8# LDPE/flame/9# EVOH/4# Bynel E388/10# LDPE |
| Structure 5. | amorphous nylon with Bynel tie layers 12# LDPE/board/3# LDPE/4# Bynel E388/6# Selar PA/ 4# Bynel E388/3# LDPE/7# LDPE |
| Structure 6. | Polyester 12# LDPE/board/3# LDPE/4# Bynel E369/7.5# PET/ 4# Bynel E369/3# LDPE/7# LDPE |
| Structure 7. | LDPE milk carton 12# LDPE/board/20# LDPE |

TABLE 2

Target and measured barrier polymer thicknesses and measured oxygen permeabilities based on target thicknesses (5° C., 100% RH) for the barrier structures given in Table 1.

| Structure | Polymer | Target Thickness (mils) | Measured Thickness (mils) | Oxygen Permeability (cc · mil/100 in² · day · ATM) |
|---|---|---|---|---|
| 1 | EVOH | 0.33 | 0.3–0.4 | — |
| 2 | EVOH | 0.33 | 0.3–0.4 | 0.09 |

TABLE 2-continued

Target and measured barrier polymer thicknesses and measured oxygen permeabilities based on target thicknesses (5° C., 100% RH) for the barrier structures given in Table 1.

| Structure | Polymer | Target Thickness (mils) | Measured Thickness (mils) | Oxygen Permeability (cc · mil/100 in² · day · ATM) |
|---|---|---|---|---|
| 3 | EVOH | 0.22 | 0.2–0.8 | 0.08 |
| 4 | EVOH | 0.5 | 0.5–0.6 | 0.09 |
| 5 | Selar PA | 0.33 | 0.3–0.4 | 0.24 |
| 6 | PET | 0.4 | 0.4 | 0.57 |

TABLE 3

Results of eight-week, shelf-life study.

| Week | Vitamin C (m/100 cc) | Head-Space Oxygen (%) | Dissolved Oxygen (ppm) |
|---|---|---|---|
| Structure 1 (6# EVOH Barrier; Plexar Tie Layer) | | | |
| 1 | 35.1 | 17.1 | 6.4 |
| 2 | 30.9 | 14.2 | 7.0 |
| 3 | 32.0 | 12.3 | 5.2 |
| 4 | 30.5 | 12.1 | 4.5 |
| 5 | 28.4 | 11.3 | 7.9 |
| 6 | 27.4 | 14.7 | 3.5 |
| 7 | 24.3 | 19.5 | 4.2 |
| 8 | 24.8 | 19.4 | 3.8 |
| Structure 2 (6# EVOH Barrier; Bynel Tie Layer) | | | |
| 1 | 34.3 | 13.7 | 6.0 |
| 2 | 31.5 | 12.1 | 8.8 |
| 3 | 34.2 | 11.6 | 3.6 |
| 4 | 30.7 | 10.1 | 3.9 |
| 5 | 27.0 | 14.7 | 3.9 |
| 6 | 27.7 | 7.8 | 3.3 |
| 7 | 27.5 | 7.2 | 3.8 |
| 8 | 27.8 | 7.7 | 3.2 |
| Structure 3 (4# EVOH Barrier; Bynel Tie Layer) | | | |
| 1 | 34.1 | 15.4 | 6.4 |
| 2 | 28.6 | 14.7 | 4.3 |
| 3 | 31.5 | 15.2 | 8.4 |
| 4 | 29.5 | 11.5 | 6.4 |
| 5 | 25.3 | 19.8 | 6.9 |
| 6 | 25.4 | 18.9 | 4.4 |
| 7 | 25.3 | 14.1 | 3.1 |
| 8 | 25.8 | 10.8 | 3.8 |
| Structure 4 (9# EVOH Barrier; Bynel Tie Layer) | | | |
| 1 | 33.3 | 14.9 | 8.8 |
| 2 | 29.9 | 14.8 | 4.1 |
| 3 | 32.4 | 19.5 | 5.8 |
| 4 | 31.0 | 12.0 | 4.6 |
| 5 | 26.2 | 17.0 | 4.3 |
| 6 | 28.7 | 9.5 | 3.5 |
| 7 | 27.2 | 8.2 | 3.7 |
| 8 | 27.5 | 8.3 | 3.0 |
| Structure 5 (6# Amorphous Nylon; Bynel Tie Layers) | | | |
| 1 | 34.6 | 16.6 | 8.7 |
| 2 | 31.7 | 13.2 | 8.7 |
| 3 | 33.0 | 16.4 | 6.2 |
| 4 | 31.0 | 10.7 | 4.6 |
| 5 | 26.0 | 19.3 | 6.6 |
| 6 | 27.2 | 15.1 | 3.3 |
| 7 | 21.0 | 19.8 | 4.9 |
| 8 | 25.5 | 8.1 | 3.4 |
| Structure 6 (7.5# PET Barrier; Bynel Tie Layers) | | | |
| 1 | 34.1 | 15.6 | 6.5 |
| 2 | 30.2 | 15.2 | 5.6 |
| 3 | 28.7 | 15.3 | 6.5 |

TABLE 3-continued

Results of eight-week, shelf-life study.

| Week | Vitamin C (m/100 cc) | Head-Space Oxygen (%) | Dissolved Oxygen (ppm) |
|---|---|---|---|
| 4 | 24.9 | 15.0 | 8.8 |
| 5 | 20.7 | 20.1 | 9.1 |
| 6 | 17.0 | 18.8 | 5.4 |
| 7 | 13.7 | 15.3 | 4.7 |
| 8 | 12.3 | 16.5 | 4.9 |
| Structure 7 (LDPE Milk Carton) | | | |
| 1 | 30.2 | 17.1 | 7.9 |
| 2 | 27.8 | 20.4 | 9.8 |
| 3 | 24.5 | 20.1 | 9.8 |
| 4 | 19.4 | 18.3 | 9.1 |
| 5 | 12.5 | 19.9 | 8.8 |
| 6 | 10.4 | 19.6 | 6.5 |
| 7 | 4.3 | 18.8 | 6.3 |
| 8 | 0.8 | 19.3 | 7.7 |

TABLE 4

Percent Vitamin C retention after eight weeks refrigerated storage.

| Structure | Vitamin C Retention (percent) |
|---|---|
| 1 | 71 |
| 2 | 79 |
| 3 | 74 |
| 4 | 78 |
| 5 | 73 |
| 6 | 35 |
| 7 | 2 |

TABLE 5

PROPERTY

| Film | Direction | Elongation at Fracture (%) | Tensile Strength (Psi) |
|---|---|---|---|
| Selar PA 3426 | Machine | 14.8 | 8,688 |
| 1 mil | Transverse | 6.3 | 6,410 |
| Selar PA 3426 | Machine | 96.0 | 9,580 |
| 3 mils | Transverse | 4.1 | 8,350 |
| LDPE/Bynel/Selar PA/ | Machine | 118.0 | 3,115 |
| Bynel/LDPE 1.8 mils | Transverse | 70.2 | 2,960 |
| Bynel/Selar PA/Bynel | Machine | 70.5 | 2,825 |
|  | Transverse | 15.4 | 2,450 |
| **Capran* 77C | Machine | 375–500 | 10,000–16,000 |
| 1 mil | Transverse | 375–500 | 10,000–16,000 |
| **Capran* 77K | — | 250–600 | — |

*Capran 77C is a nylon-6 and Capran 77K is a PVDC coated nylon 6 available from Allied Corporation, Morristown, New Jersey.
**As reported in Allied Corporation literature for Capran 77K and 77C.

We claim:

1. A process for manufacturing a heat-sealable paperboard laminate having enhanced gas barrier properties and improved resistance to the migration of essential oils, flavors and vitamins comprising:

(a) selecting a base material comprising a paperboard substrate having a layer of heat-sealable olefin polymer on one side of the paperboard to provide one outer surface of the laminate;

(b) coextruding over the other surface of the paperboard substrate a sandwich layer comprising a first adhesive tie layer, an amorphous nylon layer and a second adhesive tie layer; and (c) extruding a layer of heat-sealable olefin polymer over the sandwich layer to provide the other outer surface of the laminate; wherein a paperboard container made from said laminate having the amorphous nylon layer results in substantially similar vitamin C retention as a paperboard container with an ethylene vinyl alcohol barrier layer.

2. A process according to claim 1 wherein the base material is prepared by the steps of flame treating a surface of the paperboard substrate and extrusion coating a layer of a heat-sealable, low density polyethylene polymer onto the flame-treated surface of the paperboard substrate.

3. A process according to claim 1 wherein the layer of low density polyethylene polymer providing the outer surface of the paperboard comprises a heat sealable layer having a coating weight of about 6–18 lbs/ream.

4. A process according to claim 1 wherein the sandwich layer comprises in sequence a first polyolefin layer, the first tie layer, the amorphous nylon layer, the second tie layer and a second polyolefin layer.

5. A process according to claim 4 wherein the sandwich layer comprises about 2–8 lbs/ream of low density polyethylene, the first adhesive tie layer, the amorphous nylon layer, the second adhesive tie layer, and about 2–8 lbs/ream of low density polyethylene.

6. A process according to claim 5 wherein the sandwich layer comprises about 2–8 lbs/ream of low density polyethylene, about 2–6 lbs/ream of the first adhesive tie layer, the amorphous nylon layer, about 2–6 lbs/ream of the second adhesive tie layer, and about 2–8 lbs/ream of low density polyethylene.

7. A process according to claim 6 wherein the first and second tie layers comprise an anhydride modified ethylene based copolymer.

8. A process according to claim 4, wherein the paperboard substrate has a layer of about 6–18 lbs/ream of a heat-sealable low density polyethylene polymer applied to one surface; and wherein the inner sandwich layer comprises about 2–8 lbs/ream low density polyethylene, 2–6 lbs/ream of the first adhesive tie layer, 4–12 lbs/ream of an amorphous nylon, 2–6 lbs/ream of the second adhesive tie layer, and 2–8 lbs/ream of a low density polyethylene applied to the other surface of the paper board substrate, and the product contact layer comprises 5–15 lbs/ream of low density polyethylene.

9. A process according to claim 2 wherein the inner sandwich layer comprises a first anhydride modified ethylene-based copolymer tie layer, an amorphous nylon layer and a second anhydride modified ethylene-based copolymer tie layer, and the polyolefin layer comprises 5–15 lbs/ream of low density polyolefin.

10. A process according to claim 9 wherein the inner sandwich layer comprises 2–6 lbs/ream of an anhydride modified copolymer tie layer, an amorphous nylon layer, 2–6 lbs/ream anhydride modified copolymer tie layer.

11. A process according to claim 9 wherein the paperboard has a layer of about 6–18 lbs/ream of a heat-sealable low density polyethylene polymer applied to one surface and wherein said inner sandwich layer comprises 2–6 lbs/ream of the first anhydride modified ethylene-based copolymer tie layer, 4–12 lbs/ream of amorphous nylon and 2–6 lbs/ream of the second anhydride modified ethylene-based copolymer tie layer.

12. A process according to claim 1 wherein the inner sandwich layer has a tensile strength at yield of no more than about 4000 psi.

13. A process according to claim 1 wherein the inner sandwich layer has an elongation at break of not more than about 200%.

14. A process according to claim 4 wherein the heat-sealable olefin on one side of the paperboard is 12 lbs/ream LDPE and the inner sandwich layer comprises 6 lbs/ream LDPE, 4 lbs/ream anhydride modified ethylene-based copolymer tie layer, 6 lbs/ream amorphous nylon, 4 lbs/ream anhydride modified ethylene-based copolymer tie layer, 6 lbs/ream LDPE, and the heat-sealable olefin polymer over the sandwich layer is 7 lbs/ream LDPE, and wherein the inner sandwich layer has a tensile strength at yield of no more than about 4000 psi and an elongation at break not more than about 200%.

15. A process according to claim 4 wherein the heat-sealable olefin on one side of the paperboard is 12 lbs/ream LDPE and the inner sandwich layer comprises 3 lbs/ream LDPE, 4 lbs/ream anhydride modified ethylene-based copolymer tie layer, 6 lbs/ream amorphous nylon, 4 lbs/ream anhydride modified ethylene-based copolymer tie layer, 3 lbs/ream LDPE, and the heat-sealable olefin polymer over the sandwich layer is 7 lbs/ream LDPE, and wherein the inner sandwich layer has a tensile strength at yield of no more than about 4000 psi and an elongation at break not more than about 200%.

* * * * *

UNITED STATES PATENT AND TRADEMARK OFFICE
CERTIFICATE OF CORRECTION

PATENT NO.   : 6,193,827 B1
DATED        : February 27, 2001
INVENTOR(S)  : Parks et al.

It is certified that error appears in the above-identified patent and that said Letters Patent is hereby corrected as shown below:

Title page,
Item [56], References Cited, OTHER PUBLICATIONS: "Mamleic" should read -- Maleic --

Column 1,
Line 8: [Query: "Apr. 29, 1992" should read -- Mar. 29, 1992 -- ? (*cf.* Amendment A)]

Column 2,
Line 11, "duPont" should read -- DuPont --
Line 12, "tinder" should read -- under --
Line 28, "abuse-resistent" should read -- abuse-resistant --

Column 5,
Line 29 and 30, "duPont" should read -- DuPont --

Column 7,
Line 18, "PVDC-coated" should read -- PVdC-coated --
Line 23, "PVDC" should read -- PVdC --

Column 9,
Table 4, heading: "afier" should read -- after --
Table 5, footnotes: "PVDC" should read -- PVdC --

UNITED STATES PATENT AND TRADEMARK OFFICE
CERTIFICATE OF CORRECTION

PATENT NO. : 6,193,827B1
DATED : February 27, 2001
INVENTOR(S) : Parks et al.

It is certified that error appears in the above-identified patent and that said Letters Patent is hereby corrected as shown below:

Column 10,
Line 9, "flame treating" should read -- flame-treating --
Line 15, "heat sealable" should read -- heat-sealable --
Line 34, "ethylene" should read -- ethylene- --
Line 45, "paper board" should read -- paperboard --
Line 56, "2-6" should read -- and 2-6 --

Signed and Sealed this

Ninth Day of April, 2002

Attest:

JAMES E. ROGAN
*Attesting Officer*     *Director of the United States Patent and Trademark Office*